United States Patent
Müller et al.

(10) Patent No.: US 9,273,183 B2
(45) Date of Patent: Mar. 1, 2016

(54) POLYETHER CARBONATE POLYOL PRODUCTION METHOD

(71) Applicant: Bayer MaterialScience AG, Leverkusen (DE)

(72) Inventors: Thomas Ernst Müller, Aachen (DE); Christoph Gürtler, Köln (DE); Matthias Wohak, Dormagen (DE); Jörg Hofmann, Krefeld (DE); Muhammad Afzal Subhani, Aachen (DE); Walter Leitner, Aachen (DE); Ilja Peckermann, Köln (DE); Aurel Wolf, Wülfrath (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/424,171

(22) PCT Filed: Aug. 23, 2013

(86) PCT No.: PCT/EP2013/067578
§ 371 (c)(1),
(2) Date: Feb. 26, 2015

(87) PCT Pub. No.: WO2014/033070
PCT Pub. Date: Mar. 6, 2014

(65) Prior Publication Data
US 2015/0225503 A1   Aug. 13, 2015

(30) Foreign Application Priority Data

Aug. 27, 2012 (EP) .................... 12181905

(51) Int. Cl.
C08G 64/30 (2006.01)
C08G 65/26 (2006.01)
C08G 64/34 (2006.01)
C08G 18/48 (2006.01)

(52) U.S. Cl.
CPC ............. *C08G 64/305* (2013.01); *C08G 64/34* (2013.01); *C08G 65/2663* (2013.01); *C08G 18/4833* (2013.01)

(58) Field of Classification Search
CPC . C08G 64/34; C08G 65/2663; C08G 18/4833
See application file for complete search history.

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 5,158,922 A | 10/1992 | Hinney et al. | |
| 5,470,813 A | 11/1995 | Le-Khac | |
| 6,767,986 B2 | 7/2004 | Moethrath et al. | |
| 6,780,813 B1 | 8/2004 | Hofmann et al. | |
| 6,835,687 B2 | 12/2004 | Hofmann et al. | |
| 7,008,900 B1 | 3/2006 | Hofmann et al. | |
| 8,247,520 B2 | 8/2012 | Allen et al. | |
| 8,324,419 B2 | 12/2012 | Mijolovic et al. | |
| 8,933,192 B2 | 1/2015 | Gürtler et al. | |
| 2013/0211042 A1* | 8/2013 | Gurtler .................. | C08G 64/34 528/405 |

FOREIGN PATENT DOCUMENTS

| | | |
|---|---|---|
| EP | 0 222 453 A2 | 5/1987 |
| EP | 0700949 A2 | 3/1996 |
| EP | 0743093 A1 | 11/1996 |
| EP | 0761708 A2 | 3/1997 |
| EP | 1359177 A1 | 11/2003 |
| JP | 4145123 B2 | 9/2008 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-03/029325 A1 | 4/2003 |
| WO | WO-2008092767 A1 | 8/2008 |
| WO | WO-2011089120 A1 | 7/2011 |

OTHER PUBLICATIONS

International Search Report for PCT/EP2013/067578 mailed Nov. 12, 2013.

* cited by examiner

*Primary Examiner* — Gregory Listvoyb

(74) *Attorney, Agent, or Firm* — Drinker Biddle & Reath LLP

(57) ABSTRACT

The invention relates to a method for producing polyether carbonate polyols by attaching alkylene oxides and carbon dioxide to one or more H-functional starters in the presence of a double-metal cyanide catalyst, characterized in that (alpha) a suspending agent which contains no H-functional groups and is selected from among one or more compounds from the group consisting of aliphatic lactones, aromatic lactones, lactides, cyclic carbonates comprising at least three optionally substituted methylene groups between the oxygen atoms of the carbonate group, aliphatic cyclic anhydrides, and aromatic cyclic anhydrides, is provided in a reactor; (ss) optionally, a moiety of alkylene oxide is added to the mixture from step (alpha) at temperatures of 90 to 150 DEG C., and the addition of the alkylene oxide compound is then interrupted; and (gamma) one or more H-functional starters are continuously metered into the reactor during the reaction.

15 Claims, No Drawings

POLYETHER CARBONATE POLYOL PRODUCTION METHOD

CROSS-REFERENCE TO RELATED APPLICATIONS

This application is a national stage application (under 35 U.S.C. §371) of PCT/EP2013/067578, filed Aug. 23, 2013, which claims benefit of European Application No. 12181905.6, filed Aug. 27, 2012, both of which are incorporated herein by reference in their entirety.

The present invention relates to a process for the preparation of polyether carbonate polyols by catalytic copolymerisation of carbon dioxide ($CO_2$) with alkylene oxides in the presence of one or more H-functional starter substances.

The preparation of polyether carbonate polyols by catalytic reaction of alkylene oxides (epoxides) and carbon dioxide in the presence of H-functional starter substances ("starters") has been the subject of intensive research for more than 40 years (e.g. Inoue et al., Copolymerization of Carbon Dioxide and Epoxide with Organometallic Compounds; Die Makromolekulare Chemie 130, 210-220, 1969). This reaction is shown schematically in scheme (I), wherein R represents an organic radical such as alkyl, alkylaryl or aryl, each of which can also contain heteroatoms such as, for example, O, S, Si, etc., and wherein e, f and g represent an integer, and wherein the product shown here in scheme (I) for the polyether carbonate polyol is simply to be so understood that blocks having the structure shown can in principle be found again in the resulting polyether carbonate polyol but the sequence, number and length of the blocks as well as the OH functionality of the starter can vary and is not limited to the polyether carbonate polyol shown in scheme (I). This reaction (see scheme (I)) is ecologically very advantageous because this reaction represents the conversion of a greenhouse gas such as $CO_2$ into a polymer. The cyclic carbonate (for example for R=$CH_3$ propylene carbonate) shown in scheme (I) is formed as a further product, actually a secondary product.

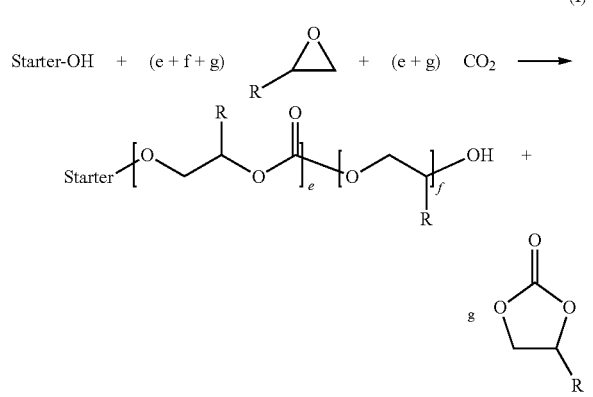

EP-A 0 222 453 discloses a process for the preparation of polycarbonates from alkylene oxides and carbon dioxide using a catalyst system comprising a DMC catalyst and a co-catalyst such as zinc sulfate. The polymerisation is initiated by bringing a portion of the alkylene oxide into contact one time with the catalyst system. Only then are the residual amount of alkylene oxide and the carbon dioxide metered in simultaneously. The amount of 60 wt. % alkylene oxide compound, relative to the H-functional starter compound, indicated in EP-A 0 222 453 for the activation step in Examples 1 to 7 is high and has the disadvantage that this represents a certain safety risk for large-scale applications owing to the highly exothermic nature of the homopolymerisation of alkylene oxide compounds.

WO-A 2003/029325 discloses a process for the preparation of high molecular weight aliphatic polyether carbonate polyols (weight-average molecular weight greater than 30,000 g/mol) in which a catalyst from the group consisting of zinc carboxylate and multimetal cyanide compound is used, which catalyst is anhydrous and is first brought into contact with at least a partial amount of the carbon dioxide before the alkylene oxide is added. Final $CO_2$ pressures of up to 150 bar make very high demands on the reactor and in terms of safety. Even at the extremely high pressure of 150 bar, only from about 33 wt. % $CO_2$ to a maximum of 42 wt. % $CO_2$ were incorporated. The examples presented describe the use of a solvent (toluene), which must be separated off again thermally after the reaction, which leads to an increased outlay in terms of time and cost. Furthermore, the polymers, with an inhomogeneity or polydispersity of 2.7 or more, have a very wide molar mass distribution.

WO-A 2008/092767 discloses a process for the preparation of polyether carbonate polyols, characterised in that one or more H-functional starter substances are initially placed in the reactor and in that one or more H-functional starter substances are metered into the reactor continuously during the reaction. This process accordingly has the disadvantage that one or more H-functional starter substances must be placed in the reactor initially.

The object of the present invention was, therefore, to provide a process for the preparation of polyether carbonate polyols in which no H-functional starter substances have to be placed in the reactor initially, the process yielding a product that results in a high content of incorporated $CO_2$ in the resulting polyether carbonate polyol, and advantageous selectivity (i.e. low ratio of cyclic carbonate to linear polymer-bound carbonate) at the same time being achieved.

Surprisingly, it has been found that the object according to the invention is achieved by a process for the preparation of polyether carbonate polyols from one or more H-functional starter substance(s), one or more alkylene oxide(s) and carbon dioxide in the presence of a DMC catalyst, characterised in that (α) a suspending agent that does not contain H-functional groups and is selected from one or more compound(s) from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides is initially placed in a reactor, optionally together with DMC catalyst, (β) a partial amount of alkylene oxide is optionally added to the mixture from step (α) at temperatures of from 90 to 150° C., the addition of the alkylene oxide compound then being interrupted, and (γ) one or more H-functional starter substance(s) are metered into the reactor continuously during the reaction.

In the process according to the invention, a suspending agent that does not contain H-functional groups is first placed in the reactor. The amount of DMC catalyst, which is preferably not activated, required for the polyaddition is then added to the reactor. The sequence of the addition is not critical. It is also possible to introduce first the DMC catalyst and then the suspending agent into the reactor. Alternatively, the DMC catalyst can also first be suspended in the inert suspending agent and then the suspension can be introduced into the reactor. As a result of the suspending agent, a sufficient heatexchange surface with the reactor wall or with cooling elements fitted in the reactor is made available, so that the heat of reaction that is liberated can be dissipated very well. In addition, the suspending agent provides heat capacity in the event of a cooling failure, so that the temperature in that case can be kept below the decomposition temperature of the reaction mixture.

The suspending agents used according to the invention do not contain H-functional groups and are selected from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides. A mixture of two or more of the mentioned suspending agents can also be used as the suspending agent.

Aliphatic or aromatic lactones within the scope of the invention are cyclic compounds containing an ester bond in the ring, preferably compounds of formula (II), (III) or (IV)

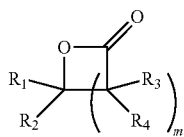

(II)

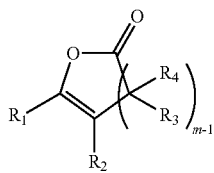

(III)

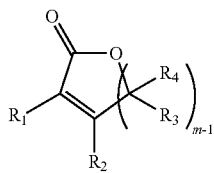

(IV)

wherein
R1, R2, R3 and R4 independently of one another represent hydrogen, a linear or branched C1 to C22 alkyl radical optionally containing heteroatoms, a linear or branched, mono- or poly-unsaturated C1 to C22 alkenyl radical optionally containing heteroatoms, or an optionally mono- or poly-substituted C6 to C18 aryl radical optionally containing heteroatoms, or can be members of a saturated or unsaturated 4- to 7-membered ring or polycyclic system optionally containing heteroatoms and/or ether groups,
wherein the compounds of formula (II) can also be substituted by chlorine, bromine, nitro groups or alkoxy groups,
m is an integer greater than or equal to 1, preferably 1, 2, 3 or 4,
and R3 and R4 in repeating units (m>1) can be different.

Preferred compounds of formulae (II), (III) or (IV) are 4-membered cyclic lactones, such as β-propiolactone, β-butyrolactone, β-isovalerolactone, β-caprolactone, β-isocaprolactone, β-methyl-β-valerolactone,
5-membered cyclic lactones, such as, γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one,
6-membered cyclic lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one 7-membered cyclic lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, higher-membered cyclic lactones, such as (7E)-oxacycloheptadec-7-en-2-one.

Particular preference is given to ε-caprolactone and dihydrocoumarin.

Lactides within the scope of the invention are cyclic compounds containing two or more ester bonds in the ring, preferably compounds of formula (V)

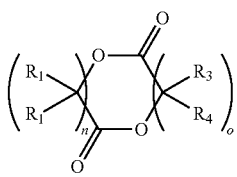

(V)

wherein R1, R2, R3 and R4 have the meaning given above, and n and o independently of one another are an integer greater than or equal to 1, preferably 1, 2, 3, or 4,
and R1 and R2 in repeating units (n>1) and R3 and R4 in repeating units (o>1) can in each case be different.

Preferred compounds of formula (V) are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, 3,6-di(but-3-en-1-yl)-1,4-dioxane-2,5-dione (in each case including optically active forms). Particular preference is given to L-lactide.

As cyclic carbonates having at least three optionally substituted methylene groups between the oxygen atoms of the carbonate group there are preferably used compounds of formula (VI)

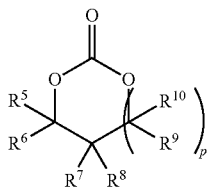

(VI)

wherein
R5, R6, R7, R8, R9 and R10 independently of one another represent hydrogen, a linear or branched C1 to C22 alkyl radical optionally containing heteroatoms, a linear or branched, mono- or poly-unsaturated C1 to C22 alkenyl radical optionally containing heteroatoms, or an optionally mono- or poly-substituted C6 to C18 aryl radical optionally containing heteroatoms, or can be members of a saturated or unsaturated 4- to 7-membered ring or polycyclic system optionally containing heteroatoms,
p is an integer greater than or equal to 1, preferably 1, 2 or 3, and R9 and R10 in repeating units (p>1) can be different,
and wherein the compounds of formula (VI) can also be substituted by chlorine, bromine, nitro groups or alkoxy groups.

Preferred compounds of formula (VI) are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methyl-butane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Cyclic carbonates having fewer than three optionally substituted methylene groups between the oxygen atoms of the carbonate group are not incorporated or are incorporated in only a small amount into the polymer chain under the conditions of the process according to the invention for the copolymerisation of epoxides and $CO_2$.

Cyclic carbonates having fewer than three optionally substituted methylene groups between the oxygen atoms of the carbonate group can, however, be used together with suspending agents consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides. Preferred cyclic carbonates having fewer than three optionally substituted methylene groups between the oxygen atoms of the carbonate group are ethylene carbonate, propylene carbonate, 2,3-butanediol carbonate, 2,3-pentanediol carbonate, 2-methyl-1,2-propanediol carbonate, 2,3-dimethyl-2,3-butanediol carbonate.

As cyclic anhydrides there are preferably used compounds of formula (VII), (VIII) or (IX)

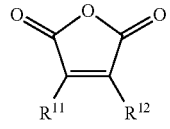
(VII)

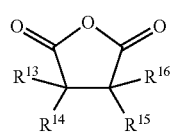
(VIII)

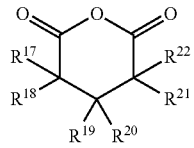
(IX)

wherein
R11 and R12 represent hydrogen, halogen, linear or branched C1-C22-alkyl substituents optionally containing heteroatoms, linear or branched, mono- or poly-unsaturated C1-C22-alkenyl substituents optionally containing heteroatoms, or optionally mono- or poly-substituted C6-C18-aryl substituents optionally containing heteroatoms, or R11 and R12 can be members of a saturated or unsaturated 4- to 7-membered ring or polycyclic system optionally containing heteroatoms, preferably R11 and R12 together form a benzene ring,
R13, R14, R15 and R16 represent hydrogen, linear or branched C1-C22-alkyl substituents optionally containing heteroatoms, linear or branched, mono- or poly-unsaturated C1-C22-alkenyl substituents optionally containing heteroatoms, or optionally mono- or poly-substituted C6-C18-aryl substituents optionally containing heteroatoms, or can be members of a saturated or unsaturated 4- to 7-membered ring or polycyclic system optionally containing heteroatoms,
R17, R18, R19, R20, R21 and R22 represent hydrogen, linear or branched C1-C22-alkyl substituents optionally containing heteroatoms, linear or branched, mono- or poly-unsaturated C1-C22-alkenyl substituents optionally containing heteroatoms, or optionally mono- or poly-substituted C6-C18-aryl substituents optionally containing heteroatoms, or can be members of a saturated or unsaturated 4- to 7-membered ring or polycyclic system optionally containing heteroatoms,
and wherein the compounds of formulae (VII) and (VIII) and (IX) can also be substituted by chlorine, bromine, nitro groups or alkoxy groups.

Preferred compounds of formula (VII), (VIII) or (IX) are succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

There is most preferably used as the suspending agent ε-caprolactone, dihydrocoumarin, trimethylene carbonate, neopentyl glycol carbonate, 3,6-dimethyl-1,4-dioxane-2,5-dione, succinic anhydride, maleic anhydride and phthalic anhydride and mixtures of two or more of those suspending agents.

As already mentioned, a mixture of one or more of the above-mentioned suspending agents according to the invention that do not contain H-functional groups can also be used for activating the DMC catalyst. Preference is given to the use of a mixture of a suspending agent selected from a first group consisting of aliphatic lactone, aromatic lactone, lactide, or cyclic carbonate having at least three optionally substituted methylene groups between the oxygen atoms of the carbonate group with a suspending agent selected from a second group consisting of aliphatic cyclic anhydride or aromatic cyclic anhydride. Particular preference is given to the use of a mixture of a suspending agent selected from a first group consisting of ε-caprolactone, dihydrocoumarin, trimethylene carbonate and neopentyl glycol carbonate with a suspending agent selected from a second group consisting of succinic anhydride, maleic anhydride and phthalic anhydride.

Step (α):

Preferably, in step (α), at least one of the suspending agents according to the invention that does not contain H-functional groups is initially placed in the reactor, optionally together with DMC catalyst, and no H-functional starter substance is thereby initially placed in the reactor. Alternatively, in step (α), at least one of the suspending agents according to the invention that does not contain H-functional groups and, in addition, a partial amount of the H-functional starter substance(s) and optionally DMC catalyst can initially also be placed in the reactor.

The DMC catalyst is preferably used in an amount such that the content of DMC catalyst in the resulting reaction product is from 10 to 10,000 ppm, particularly preferably from 20 to 5000 ppm and most preferably from 50 to 500 ppm.

In a preferred embodiment, inert gas (for example argon or nitrogen), an inert gas/carbon dioxide mixture or carbon dioxide is introduced into the resulting mixture of suspending agent and DMC catalyst at a temperature of from 90 to 150° C., particularly preferably from 100 to 140° C., and at the same time a reduced pressure (absolute) of from 10 mbar to 800 mbar, particularly preferably from 50 mbar to 200 mbar, is applied.

In an alternative preferred embodiment, the resulting mixture of suspending agent and DMC catalyst is subjected at least once, preferably three times, to from 1.5 bar to 10 bar (absolute), particularly preferably from 3 bar to 6 bar (absolute), of an inert gas (for example argon or nitrogen), an inert gas/carbon dioxide mixture or carbon dioxide at a temperature of from 90 to 150° C., particularly preferably from 100 to 140° C., and in each case the excess pressure is then reduced to about 1 bar (absolute).

The DMC catalyst can be added in solid form or in the form of a suspension in a suspending agent or in a mixture of at least two suspending agents.

In a further preferred embodiment, in step (α)

(α-I) the suspending agent or a mixture of at least two suspending agents is initially placed in the reactor, and (α-II) the temperature of the suspending agent or of the mixture of at least two suspending agents is brought to from 50 to 200° C., preferably from 80 to 160° C., particularly preferably from 100 to 140° C., and/or the pressure in the reactor is lowered to less than 500 mbar, preferably from 5 mbar to 100 mbar, an inert gas stream (for example of argon or nitrogen), an inert gas/carbon dioxide stream or a carbon dioxide stream optionally being passed through the reactor, wherein the double metal cyanide catalyst is added to the suspending agent or to the mixture of at least two suspending agents in step (α-I) or immediately thereafter in step (α-II), and wherein the suspending agent does not contain H-functional groups.

Step (β):

Step (β) serves to activate the DMC catalyst. This step can optionally be carried out under an inert gas atmosphere, under an atmosphere of an inert gas/carbon dioxide mixture, or under a carbon dioxide atmosphere. Activation within the scope of this invention denotes a step in which a partial amount of alkylene oxide compound is added to the DMC catalyst suspension at temperatures of from 90 to 150° C., and then the addition of the alkylene oxide compound is interrupted, there being observed the evolution of heat as a result of a subsequent exothermic chemical reaction, which can lead to a temperature peak ("hotspot"), and a pressure drop in the reactor as a result of the reaction of alkylene oxide and optionally $CO_2$. The process step of activation is the period of time from the addition of the partial amount of alkylene oxide compound, optionally in the presence of $CO_2$, to the DMC catalyst to the occurrence of the evolution of heat. The partial amount of alkylene oxide compound can optionally be added to the DMC catalyst in a plurality of individual steps, optionally in the presence of $CO_2$, and then the addition of the alkylene oxide compound can be interrupted in each case. In this case, the process step of activation covers the period of time from the addition of the first partial amount of alkylene oxide compound, optionally in the presence of $CO_2$, to the DMC catalyst to the occurrence of the evolution of heat after the addition of the last partial amount of alkylene oxide compound. In general, the activation step can be preceded by a step for drying the DMC catalyst and optionally the H-functional starter compound at elevated temperature and/or reduced pressure, optionally while passing an inert gas through the reaction mixture.

The metered addition of one or more alkylene oxides (and optionally of the carbon dioxide) can in principle take place in various ways. The start of the metered addition can take place from the vacuum or at a previously chosen preliminary pressure. The preliminary pressure is preferably established by passing in an inert gas (such as, for example, nitrogen or argon) or carbon dioxide, the pressure (absolute) being from 5 mbar to 100 bar, preferably from 10 mbar to 50 bar and more preferably from 20 mbar to 50 bar.

In a preferred embodiment, the amount of one or more alkylene oxides used in the activation in step (β) is from 0.1 to 25.0 wt. %, preferably from 1.0 to 20.0 wt. %, particularly preferably from 2.0 to 16.0 wt. % (based on the amount of suspending agent used in step (α)). The alkylene oxide can be added in one step or in portions in a plurality of partial amounts. After the addition of a partial amount of alkylene oxide compound, the addition of the alkylene oxide compound is preferably interrupted until the evolution of heat occurs, and only then is the next partial amount of alkylene oxide compound added. A two-stage activation (step β) is also preferred, wherein (β1) in a first activation stage, the addition of a first partial amount of alkylene oxide under an inert gas atmosphere takes place, and (β2) in a second activation stage, the addition of a second partial amount of alkylene oxide under a carbon dioxide atmosphere takes place.

Step γ:

The metered addition of one or more H-functional starter substance(s), of one or more alkylene oxide(s) and optionally also of the carbon dioxide can take place simultaneously or sequentially (in portions); for example, the entire amount of carbon dioxide, the amount of H-functional starter substances and/or the amount of alkylene oxides metered in step (γ) can be added in a single batch or continuously. The term "continuously" used here, as a mode of adding a reactant, can be so defined that a concentration of the reactant that is effective for the copolymerisation is maintained, that is to say, for example, the metered addition can take place with a constant metering rate, with a varying metering rate or in portions.

During the addition of the alkylene oxide and/or of the H-functional starter substances, the $CO_2$ pressure can be increased or lowered gradually or stepwise or left the same. Preferably, the total pressure is kept constant during the reaction by the metered addition of further carbon dioxide. The metered addition of one or more alkylene oxide(s) and/or of the one or more H-functional starter substance(s) takes place simultaneously or sequentially to the metered carbon dioxide addition. It is possible to meter in the alkylene oxide with a constant metering rate or to increase or reduce the metering rate gradually or stepwise or to add the alkylene oxide in portions. The alkylene oxide is preferably added to the reaction mixture with a constant metering rate. If a plurality of alkylene oxides are used for the synthesis of the polyether carbonate polyols, the alkylene oxides can be metered in individually or in the form of a mixture. The metered addition of the alkylene oxides or of the H-functional starter substances can take place simultaneously or sequentially via separate metered additions (additions) or via one or more metered additions, it being possible for the alkylene oxides or the H-functional starter substances to be added individually or in the form of a mixture. Via the nature and/or sequence of the metered addition of the H-functional starter substances, of the alkylene oxides and/or of the carbon dioxide it is possible to synthesise random, alternating, block-like or gradient-like polyether carbonate polyols.

In a preferred embodiment, the metered addition of the one or more H-functional starter substance(s) in step ($\gamma$) is ended, in terms of time, before the addition of the alkylene oxide.

Preferably, an excess of carbon dioxide, based on the calculated amount of incorporated carbon dioxide in the polyether carbonate polyol, is used because an excess of carbon dioxide is advantageous due to the slowness of carbon dioxide to react. The amount of carbon dioxide can be established via the total pressure under the reaction conditions in question. The range from 0.01 to 120 bar, preferably from 0.1 to 110 bar, particularly preferably from 1 to 100 bar, has been found to be advantageous as the total pressure (absolute) for the copolymerisation for the preparation of the polyether carbonate polyols. It is possible to supply the carbon dioxide continuously or discontinuously. This depends on how quickly the alkylene oxides are consumed and whether the product is to contain optionally $CO_2$-free polyether blocks. The amount of carbon dioxide (indicated as the pressure) can likewise vary during the addition of the alkylene oxides. $CO_2$ can also be added to the reactor in the form of a solid and then change into the gaseous, dissolved, liquid and/or supercritical state under the chosen reaction conditions.

A preferred embodiment of the process according to the invention is characterised inter alia in that in step ($\gamma$) the total amount of the one or more H-functional starter substance(s) is added. The addition can take place with a constant metering rate, with a varying metering rate or in portions.

For the process according to the invention it has further been shown that the copolymerisation (step ($\gamma$)) for the preparation of the polyether carbonate polyols is advantageously carried out at from 50 to 150° C., preferably at from 60 to 145° C., particularly preferably at from 70 to 140° C. and most particularly preferably at from 90 to 130° C. If temperatures below 50° C. are set, the reaction is generally very slow. At temperatures above 150° C., the amount of undesirable secondary products increases considerably.

The metered addition of the alkylene oxide, of the H-functional starter compound and of the DMC catalyst can take place via separate or common metering sites. In a preferred embodiment, the alkylene oxide and the H-functional starter compound are fed to the reaction mixture continuously via separate metering sites. This addition of the one or more H-functional starter substance(s) can take place in the form of a continuous metered addition into the reactor or in portions.

Steps ($\alpha$), ($\beta$) and ($\gamma$) can be carried out in the same reactor or separately in different reactors. Particularly preferred reactor types are: tubular reactors, stirred vessels, loop reactors.

Polyether carbonate polyols can be prepared in a stirred vessel, the stirred vessel being cooled, according to the design and mode of operation, via the reactor jacket, internal cooling surfaces and/or cooling surfaces located in a pump circuit. Both in semi-batch operation, where the product is not removed until the end of the reaction, and in continuous operation, where the product is removed continuously, particular attention is to be paid to the metering rate of the alkylene oxide. It is to be so adjusted that the alkylene oxides react to completion sufficiently quickly despite the inhibiting action of the carbon dioxide. The concentration of free alkylene oxides in the reaction mixture during the activation step (step $\beta$) is preferably from >0 to 100 wt. %, particularly preferably from >0 to 50 wt. %, most preferably from >0 to 20 wt. % (in each case based on the weight of the reaction mixture). The concentration of free alkylene oxides in the reaction mixture during the reaction (step $\gamma$) is preferably from >0 to 40 wt. %, particularly preferably from >0 to 25 wt. %, most preferably from >0 to 15 wt. % (in each case based on the weight of the reaction mixture).

In a preferred embodiment, the activated DMC catalyst/suspending agent mixture obtained according to steps ($\alpha$) and ($\beta$) is reacted further with one or more alkylene oxide(s), one or more starter substance(s) and carbon dioxide in the same reactor. In a further preferred embodiment, the activated DMC catalyst/suspending agent mixture obtained according to steps ($\alpha$) and ($\beta$) is reacted further with alkylene oxides, one or more starter substance(s) and carbon dioxide in a different reaction vessel (for example a stirred vessel, tubular reactor or loop reactor).

When the reaction is carried out in a tubular reactor, the activated catalyst/suspending agent mixture obtained according to steps ($\alpha$) and ($\beta$), one or more H-functional starter substance(s), one or more alkylene oxide(s) and carbon dioxide are pumped continuously through a tube. The molar ratios of the reactants vary according to the desired polymer. In a preferred embodiment, carbon dioxide is metered in its liquid or supercritical form, in order to permit optimal miscibility of the components. Advantageously, mixing elements for better mixing of the reactants, as are marketed, for example, by Ehrfeld Mikrotechnik BTS GmbH, or mixer/heat exchanger elements, which simultaneously improve mixing and heat dissipation, are fitted.

Loop reactors can likewise be used for the preparation of polyether carbonate polyols. In general, these include reactors with material recycling, such as, for example, a jet loop reactor, which can also be operated continuously, or a tubular reactor with a loop configuration having suitable devices for recirculating the reaction mixture or a loop of a plurality of tubular reactors connected one behind the other. The use of a loop reactor is particularly advantageous because backmixing can be carried out here, so that the concentration of free alkylene oxides in the reaction mixture can be kept within the optimal range, preferably in the range from >0 to 40 wt. %, particularly preferably from >0 to 25 wt. %, most preferably from >0 to 15 wt. % (in each case based on the weight of the reaction mixture).

The polyether carbonate polyols are preferably prepared in a continuous process, which includes both continuous copolymerisation and continuous addition of the one or more H-functional starter substance(s).

The invention therefore also provides a process wherein, in step ($\gamma$), one or more H-functional starter substance(s), one or more alkylene oxide(s) and DMC catalyst are metered into the reactor continuously in the presence of carbon dioxide ("copolymerisation) and wherein the resulting reaction mixture (containing the reaction product) is removed from the reactor continuously. Preferably, in step ($\gamma$), the DMC catalyst is added continuously in suspension in H-functional starter compound.

For example, for the continuous process for the preparation of the polyether carbonate polyols according to steps (α) and (β), an activated DMC catalyst/suspending agent mixture is prepared and then, according to step (γ), (γ1) in each case a partial amount of one or more H-functional starter substance(s), one or more alkylene oxide(s) and carbon dioxide is metered in to initiate the copolymerisation, and (γ2) as the copolymerisation progresses, the residual amount of DMC catalyst, one or more starter substance(s) and alkylene oxide(s) is metered in continuously in the presence of carbon dioxide, wherein reaction mixture that forms is at the same time removed continuously from the reactor.

In step (γ), the DMC catalyst is preferably added in suspension in the H-functional starter compound, the amount preferably being so chosen that the content of DMC catalyst in the resulting reaction product is from 10 to 10,000 ppm, particularly preferably from 20 to 5000 ppm and most preferably from 50 to 500 ppm.

Preferably, steps (α) and (β) are carried out in a first reactor and the resulting reaction mixture is then transferred to a second reactor for the copolymerisation according to step (γ). It is, however, also possible to carry out steps (α), (β) and (γ) in one reactor.

It has also been found that the process of the present invention can be used to prepare large amounts of the polyether carbonate polyol product, wherein a DMC catalyst activated according to steps (α) and (β) in a suspending agent is used at the beginning and, during the copolymerisation (γ), the DMC catalyst is added without prior activation.

A particularly advantageous feature of the preferred embodiment of the present invention is, therefore, the ability to use "fresh" DMC catalysts without activation for the partial amount of DMC catalyst that is added continuously in step (γ). An activation of DMC catalysts that is to be carried out analogously to step (β) not only involves additional vigilance by the operator, as a result of which the manufacturing costs increase, but also requires a pressurised reaction vessel, as a result of which the capital costs when constructing a corresponding production plant also increase. "Fresh" catalyst is here defined as non-activated DMC catalyst in solid form or in the form of a suspension in a starter substance or suspending agent. The ability of the present process to use fresh, non-activated DMC catalyst in step (γ) allows significant savings to be made in the commercial production of polyether carbonate polyols and is a preferred embodiment of the present invention.

The term "continuously" used here, as a means of adding a relevant catalyst or reactant, can be so defined that a substantially continuous effective concentration of the DMC catalyst or of the reactant is maintained. The supply of catalyst can take place truly continuously or in relatively narrowly spaced increments. Likewise, a continuous addition of starter can be truly continuous or take place in increments. It would not be a departure from the present process to add a DMC catalyst or reactant incrementally in such a manner that the concentration of the added substances falls substantially to zero for a short time prior to the next incremental addition. It is, however, preferred for the DMC catalyst concentration to be kept substantially at the same concentration for the major part of the course of the continuous reaction and for starter substance to be present for the major part of the copolymerisation process. An incremental addition of DMC catalyst and/or reactant that does not substantially affect the nature of the product is nevertheless "continuous" in the sense in which the term is used here. It is, for example, conceivable to prepare a recycling loop in which a portion of the reacting mixture is fed back to a previous point in the process, whereby discontinuities brought about by incremental additions are evened out.

Step (δ)

The reaction mixture removed continuously in step (γ), which generally has a content of from 0.05 wt. % to 10 wt. % alkylene oxide, can optionally be transferred in a step (δ) into a post-reactor, in which the content of free alkylene oxide is reduced to less than 0.05 wt. % in the reaction mixture in a post-reaction. A tubular reactor, a loop reactor or a stirred vessel, for example, can be used as the post-reactor.

The pressure in the post-reactor is preferably at the same pressure as in the reaction apparatus in which reaction step (γ) is carried out. The pressure in the downstream reactor can, however, also be chosen to be higher or lower. In a further preferred embodiment, all or part of the carbon dioxide is let off after reaction step (γ), and the downstream reactor is operated at normal pressure or a slight over-pressure. The temperature in the downstream reactor is preferably from 50 to 150° C. and particularly preferably from 80 to 140° C.

The polyether carbonate polyols obtained according to the invention have, for example, a functionality of at least 1, preferably from 1 to 8, particularly preferably from 1 to 6 and most particularly preferably from 2 to 4. The molecular weight is preferably from 400 to 10,000 g/mol and particularly preferably from 500 to 6000 g/mol.

In general, alkylene oxides (epoxides) having from 2 to 24 carbon atoms can be used for the process according to the invention. Alkylene oxides having from 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidised fats as mono-, di- and tri-glycerides, epoxidised fatty acids, $C_1$-$C_{24}$-esters of epoxidised fatty acids, epichlorohydrin, glycidol and derivatives of glycidol such as, for example, methyl glycidyl ether, ethyl glycidyl ether, 2-ethylhexyl glycidyl ether, allyl glycidyl ether, glycidyl methacrylate as well as epoxide-functional alkyloxysilanes such as, for example, 3-glycidyloxypropyltrimethoxysilane, 3-glycidyloxypropyltriethoxysilane, 3-glycidyloxypropyl-tripropoxysilane, 3-glycidyloxypropyl-methyl-dimethoxysilane, 3-glycidyloxypropyl-ethyldiethoxy-silane, 3-glycidyloxypropyltriisopropoxysilane. Ethylene oxide and/or propylene oxide, in particular propylene oxide, are preferably used as the alkylene oxides.

There can be used as the suitable H-functional starter substance ("starter") compounds which have H atoms active for the alkoxylation and which have a molar mass of from 18 to 4500 g/mol, preferably from 62 to 500 g/mol and particularly preferably from 62 to 182 g/mol. The ability to use a starter having a low molar mass is a significant advantage over the use of oligomeric starters which have been prepared by prior oxyalkylation. In particular, an economy is achieved, which is made possible by the omission of a separate oxyalkylation process.

Groups which have active H atoms and which are active for the alkoxylation are, for example, —OH, —NH₂ (primary amines), —NH— (secondary amines), —SH and —CO$_2$H; —OH and —NH$_2$ are preferred; —OH is particularly preferred. There is used as the H-functional starter substance, for example, one or more compounds selected from the group consisting of mono- or poly-hydric alcohols, polyvalent amines, polyvalent thiols, aminoalcohols, thioalcohols, hydroxy esters, polyether polyols, polyester polyols, polyester ether polyols, polyether carbonate polyols, polycarbonate polyols, polycarbonates, polyethyleneimines, polyether amines, polytetrahydrofurans (e.g. PolyTHF® from BASF), polytetrahydrofuranamines, polyether thiols, polyacrylate polyols, castor oil, the mono- or di-glyceride of ricinoleic acid, monoglycerides of fatty acids, chemically modified mono-, di- and/or tri-glycerides of fatty acids, and C$_1$-C$_{24}$-alkyl fatty acid esters that contain on average at least 2 OH groups per molecule. The C$_1$-C$_{24}$-alkyl fatty acid esters that contain on average at least 2 OH groups per molecule are, for example, commercial products such as Lupranol Balance® (BASF AG), Merginol® types (Hobum Oleochemicals GmbH), Sovermol® types (Cognis Deutschland GmbH & Co. KG) and Soyol®TM types (USSC Co.).

There can be used as monofunctional starter substances alcohols, amines, thiols and carboxylic acids. There can be used as monofunctional alcohols: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. There are suitable as monofunctional amines: butylamine, tert-butylamine, pentylamine, hexylamine, aniline, aziridine, pyrrolidine, piperidine, morpholine. There can be used as monofunctional thiols: ethanethiol, 1-propanethiol, 2-propanethiol, 1-butanethiol, 3-methyl-1-butanethiol, 2-butene-1-thiol, thiophenol. There may be mentioned as monofunctional carboxylic acids: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol, 1,8-octanediol, 1,10-decanediol, 1,12-dodecanediol, bis-(hydroxymethyl)-cyclohexanes (such as, for example, 1,4-bis-(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolysates, cellulose, cellulose hydrolysates, hydroxy-functionalised fats and oils, in particular castor oil), as well as all modification products of the above-mentioned alcohols with different amounts of ε-caprolactone.

The H-functional starter substances can also be selected from the substance class of the polyether polyols which have a molecular weight M$_n$ in the range from 18 to 4500 g/mol and a functionality of from 2 to 3. Preference is given to polyether polyols that are composed of repeating ethylene oxide and propylene oxide units, preferably having a content of from 35 to 100% propylene oxide units, particularly preferably having a content of from 50 to 100% propylene oxide units. These can be random copolymers, gradient copolymers, alternating or block copolymers of ethylene oxide and propylene oxide.

The H-functional starter substances can also be selected from the substance class of the polyester polyols. At least difunctional polyesters are used as polyester polyols. Polyester polyols preferably consist of alternating acid and alcohol units. There are used as acid components, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the mentioned acids and/or anhydrides. There are used as alcohol components, for example, ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol, trimethylolpropane, glycerol, pentaerythritol or mixtures of the mentioned alcohols. If divalent or polyvalent polyether polyols are used as the alcohol component, polyester ether polyols which can likewise be used as starter substances for the preparation of the polyether carbonate polyols are obtained.

There can further be used as H-functional starter substances polycarbonate diols, which are prepared, for example, by reaction of phosgene, dimethyl carbonate, diethyl carbonate or diphenyl carbonate and difunctional alcohols or polyester polyols or polyether polyols. Examples of polycarbonates are to be found, for example, in EP-A 1359177.

In a further embodiment of the invention, polyether carbonate polyols can be used as the H-functional starter substances. In particular, polyether carbonate polyols that are obtainable by the process according to the invention described herein are used. These polyether carbonate polyols used as H-functional starter substances are prepared beforehand for this purpose in a separate reaction step.

The H-functional starter substances generally have a functionality (i.e. number of H atoms active for the polymerisation per molecule) of from 1 to 8, preferably 2 or 3. The H-functional starter substances are used either individually or in the form of a mixture of at least two H-functional starter substances.

The H-functional starter substances are particularly preferably one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, pentaerythritol, sorbitol, and polyether polyols having a molecular weight Mn in the range of from 150 to 4500 g/mol and a functionality of from 2 to 3.

The preparation of the polyether carbonate polyols is carried out by catalytic addition of carbon dioxide and alkylene oxides to H-functional starter substances. Within the scope of the invention, "H-functional" is understood as being the number of H atoms active for the alkoxylation per molecule of the starter substance.

DMC catalysts for use in the homopolymerisation of alkylene oxides are known in principle from the prior art (see e.g. U.S. Pat. No. 3,404,109, U.S. Pat. No. 3,829,505, U.S. Pat. No. 3,941,849 and U.S. Pat. No. 5,158,922). DMC catalysts which are described, for example, in U.S. Pat. No. 5,470,813, EP-A 700 949, EP-A 743 093, EP-A 761 708, WO 97/40086, WO 98/16310 and WO 00/47649 have a very high activity and permit the preparation of polyether carbonate polyols at very low catalyst concentrations, so that separation of the catalyst from the finished product is generally no longer required. A typical example is the highly active DMC catalysts described in EP-A 700 949, which contain, in addition to a double metal cyanide compound (e.g. zinc hexacyanocobaltate(III)) and an organic complex ligand (e.g. tert-butanol), also a polyether having a number-average molecular weight greater than 500 g/mol.

The DMC catalysts according to the invention are preferably obtained by
(i) in the first step, reacting an aqueous solution of a metal salt with the aqueous solution of a metal cyanide salt in the presence of one or more organic complex ligands, for example an ether or alcohol,
(ii) wherein in the second step the solid is separated from the suspension obtained from (i) by known techniques (such as centrifugation or filtration),
(iii) wherein optionally in a third step the isolated solid is washed with an aqueous solution of an organic complex ligand (e.g. by being resuspended and then isolated again by filtration or centrifugation),
(iv) wherein the resulting solid, optionally after pulverisation, is then dried at temperatures of generally from 20 to 120° C. and at pressures of generally from 0.1 mbar to normal pressure (1013 mbar),
and wherein in the first step or immediately after the precipitation of the double metal cyanide compound (second step), one or more organic complex ligands, preferably in excess (based on the double metal cyanide compound), and optionally further complex-forming components are added.

The double metal cyanide compounds contained in the DMC catalysts according to the invention are the reaction products of water-soluble metal salts and water-soluble metal cyanide salts.

For example, an aqueous solution of zinc chloride (preferably in excess, based on the metal cyanide salt such as, for example, potassium hexacyanocobaltate) and potassium hexacyanocobaltate is mixed and then dimethoxyethane (glyme) or tert-butanol (preferably in excess, based on zinc hexacyanocobaltate) is added to the resulting suspension.

Metal salts suitable for the preparation of the double metal cyanide compounds preferably have the general formula (X)

$$M(X)_n \quad (X)$$

wherein
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, M is preferably $Zn^{2+}$, $Fe^{2+}$, $Co^{2+}$ or $Ni^{2+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate, and
n is 2 when X=halide, hydroxide, carboxylate, cyanate, thiocyanate, isocyanate, isothiocyanate or nitrate,
or suitable metal salts have the general formula (XI)

$$M_r(X)_3 \quad (XI)$$

wherein
M is selected from the metal cations $Fe^{3+}$, $Al^{3+}$, $Co^{3+}$ and $Cr^{3+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate, and
r is 1 when X=halide, hydroxide, carboxylate, cyanate, thiocyanate, isocyanate, isothiocyanate or nitrate,
or suitable metal salts have the general formula (XII)

$$M(X)_s \quad (XII)$$

wherein
M is selected from the metal cations $Mo^{4+}$, $V^{4+}$ and $W^{4+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate, and
s is 4 when X=halide, hydroxide, carboxylate, cyanate, thiocyanate, isocyanate, isothiocyanate or nitrate,
or suitable metal salts have the general formula (XIII)

$$M(X)_t \quad (XIII)$$

wherein
M is selected from the metal cations $Mo^{6+}$ and $W^{6+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate, and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron (II) chloride, iron(III) chloride, cobalt(II) chloride, cobalt(II) thiocyanate, nickel(II) chloride and nickel(II) nitrate. Mixtures of different metal salts can also be used.

Metal cyanide salts suitable for the preparation of the double metal cyanide compounds preferably have the general formula (XIV)

$$(Y)_a M'(CN)_b (A)_c \quad (XIV)$$

wherein
M' is selected from one or more metal cations from the group consisting of Fe(II), Fe(III), Co(II), Co(III), Cr(II), Cr(III), Mn(II), Mn(II), Ir(III), Ni(II), Rh(III), Ru(II), V(IV) and V(V), M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and
a, b and c are integers, the values for a, b and c being so chosen that the electroneutrality of the metal cyanide salt is given; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate (III), calcium hexacyanocobaltate(III) and lithium hexacyanocobaltate(III).

Preferred double metal cyanide compounds which are contained in the DMC catalysts according to the invention are compounds of the general formula (XV)

$$M_x[M'_{x'}(CN)_y]_z \quad \text{(XV)}$$

wherein M is as defined in formulae (X) to (XIII) and
M' is as defined in formula (XIV), and
x, x', y and z are integers and are so chosen that the electroneutrality of the double metal cyanide compound is given.

Preferably,
x=3, x'=1, y=6 and z=2,
M=Zn(III), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate (II). Further examples of suitable double metal cyanide compounds are to be found, for example, in U.S. Pat. No. 5,158, 922 (column 8, lines 29-66). Zinc hexacyanocobaltate(III) is particularly preferably used.

The organic complex ligands added in the preparation of the DMC catalysts are disclosed, for example, in U.S. Pat. No. 5,158,922 (see in particular column 6, lines 9 to 65), U.S. Pat. No. 3,404,109, U.S. Pat. No. 3,829,505, U.S. Pat. No. 3,941, 849, EP-A 700 949, EP-A 761 708, JP 4 145 123, U.S. Pat. No. 5,470,813, EP-A 743 093 and WO-A 97/40086. For example, there are used as organic complex ligands water-soluble, organic compounds with heteroatoms, such as oxygen, nitrogen, phosphorus or sulfur, which are able to form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which contain both aliphatic or cycloaliphatic ether groups and aliphatic hydroxyl groups (such as, for example, ethylene glycol mono-tert-butyl ether, diethylene glycol mono-tert-butyl ether, tripropylene glycol monomethyl ether and 3-methyl-3-oxetan-methanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetan-methanol.

In the preparation of the DMC catalysts according to the invention there are optionally used one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of the glycidyl ethers, glycosides, carboxylic acid esters of polyhydric alcohols, gallic acids or salts, esters or amides thereof, cyclodextrins, phosphorus compounds, α,β-unsaturated carboxylic acid esters or ionic surface/interface-active compounds.

In the preparation of the DMC catalysts according to the invention there are preferably reacted in the first step the aqueous solutions of the metal salt (e.g. zinc chloride), used in stoichiometric excess (at least 50 mol %) based on metal cyanide salt (that is to say at least a molar ratio of metal salt to metal cyanide salt of from 2.25 to 1.00) and of the metal cyanide salt (e.g. potassium hexacyanocobaltate) in the presence of the organic complex ligand (e.g. tert-butanol), there being formed a suspension which contains the double metal cyanide compound (e.g. zinc hexacyanocobaltate), water, excess metal salt, and the organic complex ligand.

The organic complex ligand can be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the organic complex ligand with vigorous stirring. Optionally, the suspension formed in the first step is then treated with a further complex-forming component. The complex-forming component is preferably used in a mixture with water and organic complex ligand. A preferred process for carrying out the first step (i.e. the preparation of the suspension) is carried out using a mixing nozzle, particularly preferably using a jet disperser as described in WO-A 01/39883.

In the second step, the solid (i.e. the precursor of the catalyst according to the invention) is isolated from the suspension by known techniques, such as centrifugation or filtration.

In a preferred variant, the isolated solid is then washed in a third process step with an aqueous solution of the organic complex ligand (e.g. by being resuspended and then isolated again by filtration or centrifugation). In this manner, water-soluble secondary products, for example, such as potassium chloride, can be removed from the catalyst according to the invention. Preferably, the amount of organic complex ligand in the aqueous wash solution is from 40 to 80 wt. %, based on the total solution.

Optionally, further complex-forming component, preferably in the range from 0.5 to 5 wt. %, based on the total solution, is added to the aqueous wash solution in the third step.

It is additionally advantageous to wash the isolated solid more than once. Preferably, the solid is washed in a first washing step (iii-1) with an aqueous solution of the unsaturated alcohol (e.g. by being resuspended and then isolated again by filtration or centrifugation) in order thus to remove, for example, water-soluble secondary products, such as potassium chloride, from the catalyst according to the invention. Particularly preferably, the amount of unsaturated alcohol in the aqueous wash solution is from 40 to 80 wt. %, based on the total solution of the first washing step. In the further washing steps (iii-2), either the first washing step is repeated once or several times, preferably from one to three times, or, preferably, a non-aqueous solution, such as, for example, a mixture or solution of unsaturated alcohol and further complex-forming component (preferably in the range from 0.5 to 5 wt. %, based on the total amount of the wash solution of step (iii-2)), is used as the wash solution and the solid is washed therewith once or several times, preferably from one to three times.

The isolated and optionally washed solid is then, optionally after pulverisation, dried at temperatures of generally from 20 to 100° C. and at pressures of generally from 0.1 mbar to normal pressure (1013 mbar).

A preferred process for isolating the DMC catalysts according to the invention from the suspension by filtration, filter cake washing and drying is described in WO-A 01/80994.

The polyether carbonate polyols obtainable by the process according to the invention have a low content of secondary products and can be processed without difficulty, in particular by reaction with di- and/or poly-isocyanates to polyurethanes, in particular flexible polyurethane foams. For polyurethane applications, polyether carbonate polyols based on an H-functional starter substance having a functionality of at least 2 are preferably used. The polyether carbonate polyols obtainable by the process according to the invention can further be used in applications such as washing and cleaning agent formulations, drilling fluids, fuel additives, ionic and non-ionic surfactants, lubricants, process chemicals for paper or textile production, or cosmetic formulations. It is known to the person skilled in the art that, depending on the field of application in question, the polyether carbonate polyols to be used must satisfy particular material properties such as, for example, molecular weight, viscosity, functionality and/or hydroxyl number.

EXAMPLES

The invention is explained in greater detail by means of the following examples, but without being limited thereto.

H-functional starter compound ("starter") used: dipropylene glycol

The DMC catalyst was prepared according to Example 6 of WO-A 01/80994.

For carrying out the polymerisation reactions by a semi-batch CAOS process, a 300 ml pressurised reactor from Parr was used. The pressurised reactor had a height (inside) of 10.16 cm and an inside diameter of 6.35 cm. The reactor was equipped with an electric heating jacket (maximum heat output 510 watts). Counter-cooling consisted of a dip tube having an outside diameter of 6 mm, which was bent in a U-shape and projected into the reactor down to 5 mm above the bottom and through which cooling water of about 10° C. flowed. The stream of water was switched on and off by a magnetic valve. The reactor was further equipped with an inlet pipe and a temperature sensor having a diameter of 1.6 mm, which projected into the reactor down to 3 mm above the bottom.

The heat output of the electric heating jacket was on average about 20% of the maximum heat output during the activation [step (β)]. As a result of the control, the heat output fluctuated by ±5% of the maximum heat output. The occurrence of increased evolution of heat in the reactor, caused by the rapid reaction of propylene oxide during activation of the catalyst [step (β)], was observed via a reduced heat output of the heating jacket, switching on of the counter-cooling and optionally a temperature rise in the reactor. The occurrence of evolution of heat in the reactor, caused by the continuous reaction of propylene oxide during the reaction [step (γ)], led to a reduction in the output of the heating jacket to about 8% of the maximum heat output. As a result of the control, the heat output fluctuated by ±5% of the maximum heat output.

The hollow-shaft stirrer used in the examples was a hollow-shaft stirrer in which the gas was introduced into the reaction mixture via a hollow shaft of the stirrer. The stirring member attached to the hollow shaft had four arms, a diameter of 35 mm and a height of 14 mm. Two gas outlets having a diameter of 3 mm were arranged at each end of the arm. Rotation of the stirrer caused a low pressure, so that gas ($CO_2$ and optionally alkylene oxide) located above the reaction mixture was extracted by suction and introduced into the reaction mixture via the hollow shaft of the stirrer.

The copolymerisation of propylene oxide and $CO_2$ yielded, in addition to the cyclic propylene carbonate, the polyether ester carbonate polyol, which contains on the one hand polycarbonate units shown in formula (XVIa)

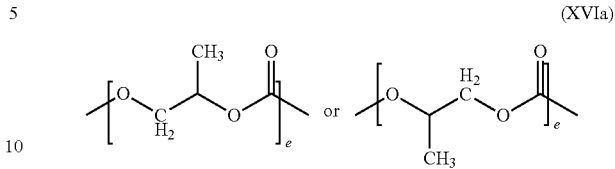

and on the other hand polyether units shown in formula (XVIb)

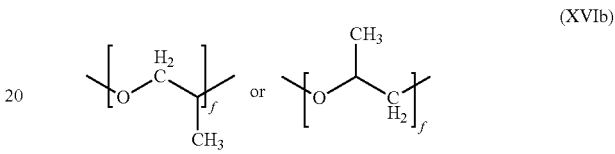

and optionally ester groups from the incorporation of the suspending agent.

Characterisation of the reaction mixture was carried out by $^1$H-NMR spectroscopy. The ratio of the amount of cyclic propylene carbonate to polyether carbonate polyol or polyether ester carbonate polyol (selectivity; g/e ratio) and the amount of unreacted monomers (propylene oxide $R_{PO}$, trimethylene carbonate $R_{TMC}$ in mol %, lactide 3,6-dimethyl-1,4-dioxane-2,4-dione $R_{LA}$, ε-caprolactone $R_{\epsilon-CL}$ in mol %, dihydrocoumarin $R_{DHC}$ in mol %) were determined by means of $^1$H-NMR spectroscopy. To that end, in each case a sample of the reaction mixture obtained after the reaction was dissolved in deuterated chloroform and measured on a spectrometer from Bruker (AV400, 400 MHz).

The reaction mixture was then diluted with dichloromethane (20 ml) and the solution was passed through a falling film evaporator. The solution (0.1 kg in 3 hours) ran down along the inside wall of a tube having a diameter of 70 mm and a length of 200 mm, which was heated to 120° C. from the outside, the reaction mixture in each case being distributed uniformly as a thin film on the inside wall of the falling film evaporator by means of three rollers having a diameter of 10 mm and rotating at a speed of 250 rpm. A pressure of 3 mbar was established inside the tube by means of a pump. The reaction mixture freed of readily volatile constituents (unreacted epoxides, cyclic carbonate, suspending agent, solvent) was caught in a receiver at the bottom end of the heated tube.

Characterisation of the polyether carbonate polyol or polyether ester carbonate polyol was carried out by $^1$H-NMR spectroscopy, gel permeation chromatography and determination of the OH number. The molar ratio of carbonate groups to ether groups in the polyether carbonate polyol or polyether ester carbonate polyol (e/f ratio) and the molar amount of comonomers incorporated into the polymer were determined by means of $^1$H-NMR spectroscopy. To that end, a sample of the purified reaction mixture was in each case dissolved in deuterated chloroform and measured on a spectrometer from Bruker (AV400, 400 MHz).

The relevant resonances in the $^1$H-NMR spectrum (based on TMS=0 ppm), which were used for the integration, are as follows:

I1: 1.10-1.17: methyl group of the polyether units, resonance area corresponds to three H atoms
I2: 1.25-1.34: methyl group of the polycarbonate units, resonance area corresponds to three H atoms
I3: 1.45-1.48: methyl group of the cyclic carbonate, resonance area corresponds to three H atoms
I4: 2.95-3.00: CH group for free, unreacted propylene oxide, resonance area corresponds to one H atom
I5: 1.82-2.18: $CH_2$ group of trimethyl carbonate incorporated into the polymer, resonance area corresponds to two H atoms
I6: 1.82-1.89: methyl group of the lactide 3,6-dimethyl-1,4-dioxane-2,5-dione incorporated into the polymer, resonance area corresponds to six H atoms
I7: 1.82-1.89: $CH_2$ group of ε-caprolactone incorporated into the polymer, resonance area corresponds to two H atoms
I8: 2.55-2.65: $CH_2$ group of dihydrocoumarin incorporated into the polymer, resonance area corresponds to two H atoms
I9: 2.12-2.18: $CH_2$ group for free, unreacted trimethyl carbonate, resonance area corresponds to two H atoms
I10: 2.27-2.34: $CH_2$ group for free, unreacted ε-caprolactone, resonance area corresponds to two H atoms
I11: 2.77-2.82: $CH_2$ group for free, unreacted dihydrocoumarin, resonance area corresponds to two H atoms The molar ratio of the amount of cyclic propylene carbonate to carbonate units in the polyether carbonate polyol or polyether ester carbonate polyol (selectivity g/e) and the molar ratio of carbonate groups to ether groups in the polyether carbonate polyol or polyether ester carbonate polyol (e/f) are indicated.

Taking into account the relative intensities, the values were calculated as follows:

Molar ratio of the amount of cyclic propylene carbonate to carbonate units in the polyether carbonate polyol or polyether ester carbonate polyol (selectivity g/e):

$$g/e = I3/I2 \quad \text{(XVI)}$$

Molar ratio of carbonate groups to ether groups in the polyether carbonate polyol or polyether ester carbonate polyol (e/f):

$$e/f = I2/I1 \quad \text{(XVIII)}$$

Amount of carbonate units in the repeating units of the polyether carbonate polyol or polyether ester carbonate polyol:

$$A_{carbonate} = [(I2/3)/((I1/3)+(I2/3)+(I5/2))] \times 100\% \quad \text{(XIX)}$$

Amount of opened trimethylene carbonate in the repeating units of the polyether carbonate polyol:

$$A_{TMC} = [(I5/2)/((I1/3)+(I2/3)+(I5/2))] \times 100\% \quad \text{(XX)}$$

Amount of opened lactide 3,6-dimethyl-1,4-dioxane-2,5-dione in the repeating units of the polyether ester carbonate polyol:

$$A_{LA} = [(I6/6)/((I1/3)+(I2/3)+(I6/6))] \times 100\% \quad \text{(XXI)}$$

Amount of opened ε-caprolactone in the repeating units of the polyether ester carbonate polyol:

$$A_{\epsilon\text{-}CL} = [(I7/2)/((I1/3)+(I2/3)+(I7/2))] \times 100\% \quad \text{(XXII)}$$

Amount of opened dihydrocoumarin in the repeating units of the polyether carbonate polyol:

$$A_{DHC} = [(I8/2)/((I1/3)+(I2/3)+(I8/2))] \times 100\% \quad \text{(XXIII)}$$

The molar amount of unreacted propylene oxide ($R_{PO}$ in mol %), based on the sum of the amount of propylene oxide used in the activation and the copolymerisation, is calculated according to the formula:

$$R_{PO} = [(I4)/((I1/3)+(I2/3-I4)+(I3/3)+I4)] \times 100\% \quad \text{(XXIV)}$$

The molar amount of unreacted trimethyl carbonate ($R_{TMC}$ in mol %), based on the sum of the amount of trimethyl carbonate used in the activation and the copolymerisation, is calculated according to the formula:

$$R_{TMC} = [(I9)/((I1/3)+(I2/3-I4)+(I3/3)+(I5)+(I9))] \times 100\% \quad \text{(XXV)}$$

The molar amount of unreacted ε-caprolactone ($R_{\epsilon\text{-}CL}$ in mol %), based on the sum of the amount of ε-caprolactone used in the activation and the copolymerisation, is calculated according to the formula:

$$R_{\epsilon\text{-}CL} = [(I10)/((I1/3)+(I2/3-I4)+(I3/3)+(I7)+(I10))] \times 100\% \quad \text{(XXVI)}$$

The molar amount of unreacted dihydrocoumarin ($R_{DHC}$ in mol %), based on the sum of the amount of dihydrocoumarin used in the activation and the copolymerisation, is calculated according to the formula:

$$R_{DHC}C = [(I11)/((I1/3)+(I2/3-I4)+(I3/3)+(I8)+(I11))] \times 100\% \quad \text{(XXVII)}$$

The number-average molecular weight $M_n$ and weight-average molecular weight $M_w$ of the resulting polyether carbonate polyols or polyether ester carbonate polyols was determined by means of gel permeation chromatography (GPC). The procedure according to DIN 55672-1: "Gel permeation chromatography, Part 1—Tetrahydrofuran as elution solvent" (SECurity GPC-System from PSS Polymer Service, flow rate 1.0 ml/min; columns: 2×PSS SDV linear M, 8×300 mm, 5 m; RID detector) was followed. Polystyrene samples of known molar mass were used for calibration. The polydispersity was calculated as the ratio $M_w/M_n$.

The OH number (hydroxyl number) was determined on the basis of DIN 53240-2, but N-methylpyrrolidone was used as solvent instead of THF/dichloromethane. Titration was carried out with 0.5 molar ethanolic KOH solution (end point detection by means of potentiometry). Castor oil with certified OH number was used as test substance. The indication of the unit in "$mg_{KOH}/g$" refers to mg[KOH]/g[polyether carbonate polyol or polyether ester carbonate polyol].

Example 1a

Activation of DMC Catalyst in the Presence of Trimethylene Carbonate and Carrying Out the Copolymerisation by the Semi-Batch CAOS Process at 105° C.

Step α:
A mixture of DMC catalyst (16 mg) and trimethylene carbonate (20 g) was placed in a 300 ml pressurised reactor equipped with a gas entrainment stirrer, and the pressurised reactor was heated to 105° C.

Step β:
2.0 g of propylene oxide were metered into the pressurised reactor by means of an HPLC pump (1 ml/min) and the reaction mixture was stirred for 20 minutes (800 rpm). Then, a further two times, 2.0 g of propylene oxide were metered in by means of the HPLC pump (1 ml/min) and the reaction mixture was stirred for 20 minutes (800 rpm).

Step γ:
15 bar $CO_2$ was applied to the pressurised reactor, whereby the temperature in the pressurised reactor fell slightly. The temperature was adjusted to 105° C., and the pressure in the pressurised reactor was maintained at 15 bar during the subsequent steps by the addition of further $CO_2$. A further 50 g of propylene oxide were metered in, with stirring, via an HPLC pump (0.08 ml/min), stirring of the reaction mixture being continued (800 rpm). Fifteen minutes after the start of the addition of propylene oxide, 4.0 g of dipropylene glycol were metered in, with stirring, via a separate HPLC pump (0.06 ml/min). When the addition of propylene oxide was complete, the reaction mixture was stirred for a further 2 hours at 105° C. The reaction was terminated by cooling the pressurised reactor in an ice bath, the excess pressure was let off, and the resulting product was analysed.

The resulting mixture was free of propylene oxide and trimethylene carbonate.

The selectivity g/e was 0.07.

The selectivity e/f was 0.14. This corresponds to an amount of carbonate units in 10.8 mol % of the repeating units of the polyether carbonate polyol ($A_{carbonate}$).

The opened trimethylene carbonate was present in 12.1 mol % of the repeating units of the polyether carbonate polyol ($A_{TMC}$).

The molar mass $M_n$ was 2953 g/mol with a polydispersity of 1.5.

The OH number was 51.0 $mg_{KOH}$/g.

Example 1b

Activation of DMC Catalyst in the Presence of Trimethylene Carbonate and Cyclic Propylene Carbonate and Carrying Out the Copolymerisation by the Semi-Batch CAOS Process at 105° C.

Step α:

A mixture of DMC catalyst (16 mg), trimethylene carbonate (3.0 g) and cyclic propylene carbonate (17.0 g) was placed in a 300 ml pressurised reactor equipped with a gas entrainment stirrer, and the pressurised reactor was heated to 105° C.

Step β:

2.0 g of propylene oxide were metered in by means of an HPLC pump (1 ml/min) and the reaction mixture was stirred for 20 minutes (800 rpm). Then, a further two times, 2.0 g of propylene oxide were metered in by means of the HPLC pump (1 ml/min) and the reaction mixture was stirred for 20 minutes (800 rpm).

Step γ:

15 bar $CO_2$ was applied to the pressurised reactor, whereby the temperature in the pressurised reactor fell slightly. The temperature was adjusted to 105° C., and the pressure in the pressurised reactor was maintained at 15 bar during the subsequent steps by the addition of further $CO_2$. A further 67 g of propylene oxide were metered in, with stirring, via an HPLC pump (0.08 ml/min), stirring of the reaction mixture being continued (800 rpm). Fifteen minutes after the start of the addition of propylene oxide, 4.0 g of dipropylene glycol were metered in, with stirring, via a separate HPLC pump (0.08 ml/min). When the addition of propylene oxide was complete, the reaction mixture was stirred for a further 2 hours at 105° C. The reaction was terminated by cooling the pressurised reactor in an ice bath, the excess pressure was let off, and the resulting product was analysed.

The resulting mixture was free of propylene oxide and trimethylene carbonate.

The selectivity g/e was 0.03.

The selectivity e/f was 0.21. This corresponds to an amount of carbonate units in 11.4 mol % of the repeating units of the polyether carbonate polyol ($A_{carbonate}$).

The opened trimethylene carbonate was present 2.2 mol % of the repeating units of the polyether carbonate polyol ($A_{TMC}$).

The molar mass $M_a$ was 4451 g/mol with a polydispersity of 1.3.

The OH number was 35.0 $mg_{KOH}$/g.

Example 2

Activation of DMC Catalyst in the Presence of 3,6-Dimethyl-1,4-Dioxane-2,5-Dione and Carrying Out the Copolymerisation by the Semi-Batch CAOS Process at 105° C.

Step α:

A mixture of DMC catalyst (16 mg) and 3,6-dimethyl-1,4-dioxane-2,5-dione (20 g) was placed in a 300 ml pressurised reactor equipped with a gas entrainment stirrer, and the pressurised reactor was heated to 105° C.

Step β:

2.0 g of propylene oxide were metered in by means of an HPLC pump (1 ml/min) and the reaction mixture was stirred for 20 minutes (800 rpm). Then, a further two times, 2.0 g of propylene oxide were metered in by means of the HPLC pump (1 ml/min) and the reaction mixture was stirred for 20 minutes (800 rpm).

Step γ:

15 bar $CO_2$ was applied to the pressurised reactor, whereby the temperature in the pressurised reactor fell slightly. The temperature was adjusted to 105° C., and the pressure in the pressurised reactor was maintained at 15 bar during the subsequent steps by the addition of further $CO_2$. A further 50 g of propylene oxide were metered in, with stirring, via an HPLC pump (0.08 ml/min), stirring of the reaction mixture being continued (800 rpm). Fifteen minutes after the start of the addition of propylene oxide, 4.0 g of dipropylene glycol were metered in, with stirring, via a separate HPLC pump (0.06 ml/min). When the addition of propylene oxide was complete, the reaction mixture was stirred for a further 2 hours at 105° C. The reaction was terminated by cooling the pressurised reactor in an ice bath, the excess pressure was let off, and the resulting product was analysed.

The resulting mixture was free of propylene oxide and 3,6-dimethyl-1,4-dioxane-2,5-dione.

The selectivity g/e was 0.05.

The selectivity e/f was 0.27. This corresponds to an amount of carbonate units in 18.6 mol % of the repeating units of the polyether ester carbonate polyol ($A_{carbonate}$).

The opened 3,6-dimethyl-1,4-dioxane-2,5-dione was present in 11.3 mol % of the repeating units of the polyether ester carbonate polyol ($A_{LA}$).

The molar mass M, was 3618 g/mol with a polydispersity of 2.0.

The OH number was 43.5 $mg_{KOH}$/g.

Example 3

Activation of DMC Catalyst in the Presence of ε-Caprolactone and Carrying Out the Copolymerisation by the Semi-Batch CAOS Process at 130° C.

Step α:

A mixture of DMC catalyst (16 mg) and ε-caprolactone (20 g) was placed in a 300 ml pressurised reactor equipped with a gas entrainment stirrer, and the pressurised reactor was heated to 130° C.

Step β:

2.0 g of propylene oxide were metered in by means of an HPLC pump (1 ml/min) and the reaction mixture was stirred for 20 minutes (800 rpm). Then, a further two times, 2.0 g of propylene oxide were metered in by means of the HPLC pump (1 ml/min) and the reaction mixture was stirred for 20 minutes (800 rpm).

Step γ:

A pressure of 15 bar $CO_2$ was applied, whereby the temperature in the pressurised reactor fell slightly. The temperature was adjusted to 130° C., and the pressure in the pressurised reactor was maintained at 15 bar during the subsequent steps by the addition of further $CO_2$. A further 50 g of propylene oxide were metered in, with stirring, via an HPLC pump (0.08 ml/min), stirring of the reaction mixture being continued (800 rpm). Fifteen minutes after the start of the addition of propylene oxide, 4.0 g of dipropylene glycol were metered in, with stirring, via a separate HPLC pump (0.06 ml/min). When the addition of propylene oxide was complete, the reaction mixture was stirred for a further 2 hours at 130° C. The reaction was terminated by cooling the pressurised reactor in an ice bath, the excess pressure was let off, and the resulting product was analysed.

The resulting mixture was free of propylene oxide and ε-caprolactone.

The selectivity g/e was 0.11.

The selectivity e/f was 0.07. This corresponds to an amount of carbonate units in 5.4 mol % of the repeating units of the polyether ester carbonate polyol ($A_{carbonate}$).

The opened ε-caprolactone was present in 12.6 mol % of the repeating units of the polyether ester carbonate polyol ($A_{\varepsilon-CL}$).

The molar mass $M_n$ was 2940 g/mol with a polydispersity of 1.3.

The OH number was 46.5 $mg_{KOH}$/g.

Example 4

Activation of DMC Catalyst in the Presence of Dihydrocoumarin and Carrying Out the Copolymerisation by the Semi-Batch CAOS Process at 130° C.

Step α:

A mixture of DMC catalyst (16 mg) and dihydrocoumarin (20 g) was placed in a 300 ml pressurised reactor equipped with a gas entrainment stirrer, and the pressurised reactor was heated to 130° C.

Step β:

2.0 g of propylene oxide were metered in by means of an HPLC pump (1 ml/min) and the reaction mixture was stirred for 20 minutes (800 rpm). Then, a further two times, 2.0 g of propylene oxide were metered in by means of the HPLC pump (L ml/min) and the reaction mixture was stirred for 20 minutes (800 rpm).

Step γ:

A pressure of 15 bar $CO_2$ was applied, whereby the temperature in the pressurised reactor fell slightly. The temperature was adjusted to 130° C., and the pressure in the pressurised reactor was maintained at 15 bar during the subsequent steps by the addition of further $CO_2$. A further 50 g of propylene oxide were metered in, with stirring, via an HPLC pump (0.08 ml/min), stirring of the reaction mixture being continued (800 rpm). Fifteen minutes after the start of the addition of propylene oxide, 4.0 g of dipropylene glycol were metered in, with stirring, via a separate HPLC pump (0.06 ml/min). When the addition of propylene oxide was complete, the reaction mixture was stirred for a further 2 hours at 130° C. The reaction was terminated by cooling the pressurised reactor in an ice bath, the excess pressure was let off, and the resulting product was analysed.

The resulting mixture was free of propylene oxide and dihydrocoumarin.

The selectivity g/e was 0.10.

The selectivity e/f was 0.20. This corresponds to an amount of carbonate units in 14.9 mol % of the repeating units of the polyether carbonate polyol ($A_{carbonate}$).

The opened dihydrocoumarin was present 10.8 mol % of the repeating units of the polyether carbonate polyol ($A_{DHC}$).

The molar mass $M_n$ was 3888 g/mol with a polydispersity of 1.4.

The OH number was 50.8 $mg_{KOH}$/g.

The invention claimed is:

1. A process for the preparation of a polyether carbonate polyol by addition of alkylene oxide and carbon dioxide to one or more H-functional starter substance in the presence of a double metal cyanide catalyst, comprising
  (α) placing a suspending agent that does not contain H-functional groups and is selected from one or more compound from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides in a reactor, and
  (γ) metering into the reactor one or more H-functional starter substance, one or more alkylene oxide and optionally carbon dioxide simultaneously or sequentially, wherein the one or more H-functional starter substance is metered into the reactor continuously during the reaction.

2. The process according to claim 1, wherein in step (α) the suspending agent that does not contain H-functional groups and is selected from one or more compound from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides is initially placed in the reactor, and no H-functional starter substance is thereby initially placed in the reactor.

3. The process according to claim 1, wherein in step (α) the suspending agent that does not contain H-functional groups and is selected from one or more compound(s) from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides, and additionally a partial amount of the H-functional starter substance are initially placed in the reactor.

4. The process according to claim 1, wherein in step (α) the suspending agent that does not contain H-functional groups and is selected from one or more compound(s) from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides is initially placed in the reactor together with DMC catalyst.

5. The process according to claim 4, wherein, following step (α),
  (β) adding a partial amount of alkylene oxide to the mixture from step (α) at temperatures of from 90 to 150° C.

6. The process according to claim 5, wherein step (β) is carried out under an inert gas atmosphere, under an atmosphere of an inert gas/carbon dioxide mixture or under a carbon dioxide atmosphere.

7. The process according to claim 5, wherein in step (β)

(β1) in a first activation step the addition of a first partial amount of alkylene oxide under an inert gas atmosphere takes place, and (β2) in a second activation step the addition of a second partial amount of alkylene oxide under a carbon dioxide atmosphere takes place.

8. The process according to claim 1, wherein in step (γ) one or more H-functional starter substance, one or more alkylene oxide are metered in continuously in the presence of carbon dioxide.

9. The process according to claim 1, wherein in step (γ) the metered addition of the one or more H-functional starter substance is ended, in terms of time, before the addition of the alkylene oxide.

10. The process according to claim 8, wherein in step (γ) DMC catalyst is metered into the reactor continuously and the resulting reaction mixture is removed from the reactor continuously.

11. The process according to claim 10, wherein the DMC catalyst is added continuously in suspension in H-functional starter compound.

12. The process according to claim 10, wherein (δ) the reaction mixture removed continuously in step (γ) having a content of from 0.05 wt. % to 10 wt. % alkylene oxide is transferred into a post-reactor in which the content of free alkylene oxide is reduced to less than 0.05 wt. % in the reaction mixture in the course of a post-reaction.

13. The process according to claim 1, wherein in step (α) the suspending agent is at least one compound selected from the group consisting of a compound of formula (II), (III), (IV), and (V)

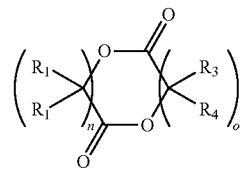

(II)

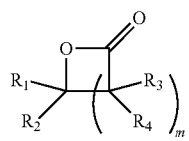

(III)

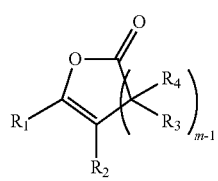

(IV)

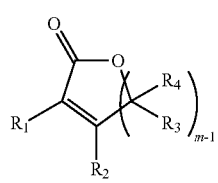

(V)

wherein

R1, R2, R3 and R4 independently of one another represent hydrogen, a linear or branched C1 to C22 alkyl radical, a linear or branched C1 to C22 alkenyl radical or a C6 to C18 aryl radical, or can be members of a 4- to 7-membered ring or polycyclic system optionally containing ether groups, wherein the compounds of formula (II) can also be substituted by chlorine, bromine, nitro groups or alkoxy groups, m is an integer greater than or equal to 1, and R3 and R4 in repeating units (m>1) can be different, and n and o independently of one another are an integer greater than or equal to 1, preferably 1, 2, 3 or 4, and R1 and R2 in repeating units (n>1) and R3 and R4 in repeating units (o>1) can be different, or a compound of formula (VI)

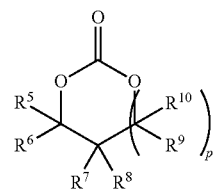

(VI)

wherein

R5, R6, R7, R8, R9 and R10 independently of one another represent hydrogen, a linear or branched C1 to C22 alkyl radical, a linear or branched C1 to C22 alkenyl radical or a C6 to C18 aryl radical, or can be members of a 4- to 7-membered ring or polycyclic system, p is an integer greater than or equal to 1, preferably 1, 2 or 3, and R9 and R10 in repeating units (p>1) can be different, and wherein the compounds of formula (VI) can also be substituted by chlorine, bromine, nitro groups or alkoxy groups, or a compound of formula (VII), (VIII) or (IX)

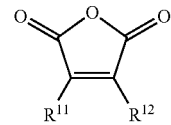

(VII)

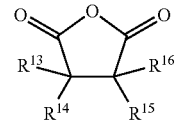

(VIII)

-continued

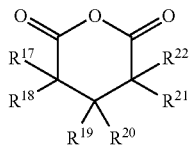

(IX)

wherein
R11 and R12 represent hydrogen, halogen, C1-C22-alkyl, C1-C22-alkenyl or C6-C18-aryl, or R11 and R12 can be members of a 4- to 7-membered ring or polycyclic system, preferably R11 and R12 together form a benzene ring,
R13, R14, R15 and R16 represent hydrogen, C1-C22-alkyl, C1-C22-alkenyl or C6-C18-aryl, or can be members of a 4- to 7-membered ring or polycyclic system,
R17, R18, R19, R20, R21 and R22 represent hydrogen, C1-C22-alkyl, C1-C22-alkenyl or C6-C18-aryl, or can be members of a 4- to 7-membered ring or polycyclic system, and wherein the compounds of formulae (VII) and (VIII) and (IX) can also be substituted by chlorine, bromine, nitro groups or alkoxy groups.

14. The process according to claim 1, wherein in step (α) the suspending agent is selected from the group consisting of ε-caprolactone, dihydrocoumarin, trimethylene carbonate, neopentyl glycol carbonate, 3,6-dimethyl-1,4-dioxane-2,5-dione, succinic anhydride, maleic anhydride, phthalic anhydride, and mixtures of two or more of those suspending agents.

15. The process according to claim 1, wherein the H-functional starter substance is selected from at least one of the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, pentaerythritol, sorbitol, and polyether polyols having a molecular weight Mn in the range of from 150 to 4500 g/mol and a functionality of from 2 to 3.

* * * * *